(12) United States Patent
Piekarski

(10) Patent No.: US 9,798,601 B2
(45) Date of Patent: Oct. 24, 2017

(54) CONNECTION METHOD

(75) Inventor: Marek Piekarski, Macclesfield (GB)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 13/275,296

(22) Filed: Oct. 17, 2011

(65) Prior Publication Data

US 2013/0091271 A1    Apr. 11, 2013

(30) Foreign Application Priority Data

Oct. 5, 2011  (GB) ................ GB1117230.1

(51) Int. Cl.
 *G06F 15/173* (2006.01)
 *G06F 11/07* (2006.01)

(52) U.S. Cl.
 CPC ...... *G06F 11/0757* (2013.01); *G06F 11/0766* (2013.01)

(58) Field of Classification Search
 CPC .......... G06F 11/0757; G06F 11/0766
 USPC ............ 709/224, 203, 225, 226, 220
 See application file for complete search history.

(56) References Cited

U.S. PATENT DOCUMENTS

| | | | |
|---|---|---|---|
| 5,825,990 A * | 10/1998 | Heo ............ | H04N 1/00488 358/1.14 |
| 2002/0194319 A1* | 12/2002 | Ritche ............ | 709/223 |
| 2006/0136789 A1* | 6/2006 | Oshida ............ | 714/43 |
| 2007/0240209 A1* | 10/2007 | Lewis ............ | H04W 80/06 726/15 |
| 2008/0288633 A1* | 11/2008 | Evans et al. ............ | 709/224 |
| 2009/0268738 A1* | 10/2009 | Tchapda ............ | G06F 13/4022 370/392 |
| 2011/0047413 A1* | 2/2011 | McGill et al. ............ | 714/15 |

* cited by examiner

*Primary Examiner* — Norman Abedin
(74) *Attorney, Agent, or Firm* — Patent Ingenuity, P.C.; Samuel K. Simpson

(57) ABSTRACT

A failure of communication between a first device and a second device is managed. A failure of communication between the first device and the second device is detected at a third device intermediate. The first data is transmitted from the third device to the first device. The first data indicates that the second device is unusable by the first device.

13 Claims, 5 Drawing Sheets

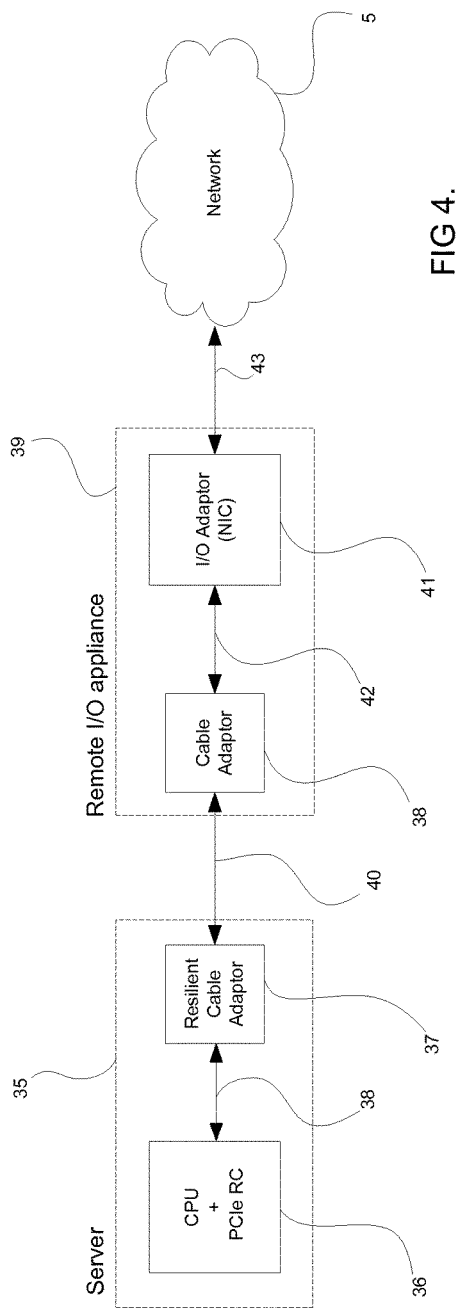
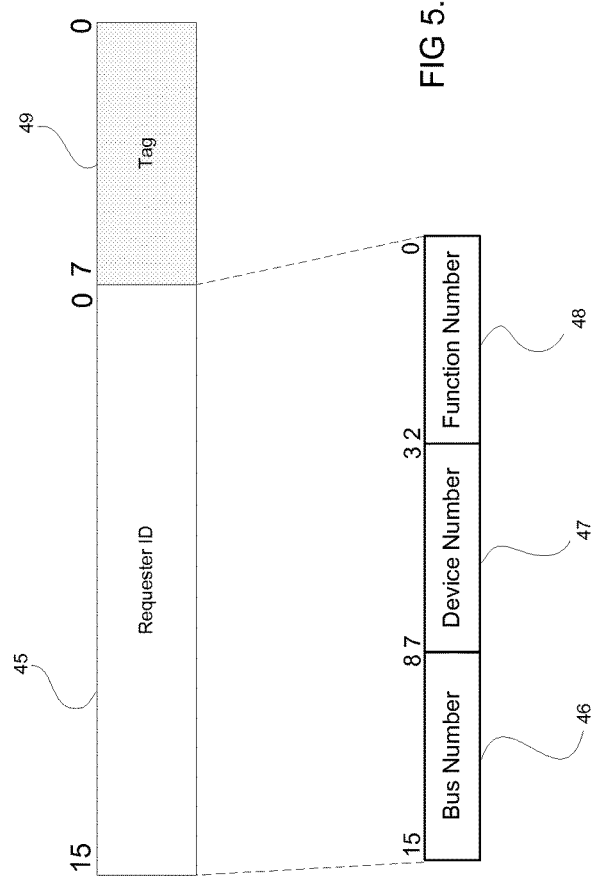
FIG 4.
FIG 5.

CONNECTION METHOD

RELATED APPLICATIONS

This patent application claims priority to UK patent application serial no. GB1117230.1, which was filed on Oct. 5, 2011.

BACKGROUND

1. Field

This disclosure generally relates to the field of communication. More particularly, the disclosure relates to managing communication failures between devices.

2. General Background

It is often necessary to send data between devices in a computer system. For example, it is often necessary to connect a processing device to a plurality of input and output devices. Appropriate data communication is achieved by connecting the devices in such a way as to allow them to send data packets to each other over a link, which may be a wired link or a wireless link.

It is increasingly important for systems of connected devices to be capable of managing unanticipated failure or unavailability of one of those connected devices. For example, systems need to be resilient (continue providing their designated service) when cables are accidentally disconnected (thereby disconnecting a connected device from a server, for example) or if a remote device fails. While, in general, operating systems provide some support for managed (i.e., planned) removal and replacement of Input/Output (I/O) adaptors in a running ("hot") system (i.e. hot-plugging/hot-swapping), little or no support is provided for unexpected removal of devices in a hot system.

Previously, PCI Express, for example, was used only for permanent connection of I/O adaptors within the server (i.e. "in-box"). For such configurations, in which an I/O device is permanently installed within the server, failure of the I/O device represents a failure of the server as a whole and as such, continued operation of that server is not considered to be necessary. An increasing interest in remotely connected PCI Express I/O devices (i.e. I/O devices connected outside a server), means that the need for servers to gracefully support unanticipated hot-removal of connected devices is becoming critical for system resilience.

The sending and receiving of data packets is often described in terms of transactions. A transaction involves one or more data packets being sent between devices. PCI Express implements a split transaction model, wherein a source device transmits a request data packet to a destination device, and awaits a completion data packet from the destination device in response. In general, operating systems are not adapted to handle failed PCI Express transactions gracefully. For example, if a server sends a request data packet to a connected device and, unexpectedly, receives no completion data packets in response to that request, the operating system of the server is likely to crash. As such, current connected systems based on PCI Express are likely to crash when a connected PCI Express resource becomes unexpectedly unavailable.

Standard implementations of PCI Express do not provide adequate means of dealing with failure of PCI Express subsystems or connected PCI Express devices. As a result, difficulties may arise in building remote or shared I/O systems which have an acceptable level of resilience to failure.

SUMMARY

In one aspect of the disclosure, a process of managing a failure of communication between a first device and a second device is provided. The process detects at a third device intermediate the first and second devices failure of communication between the first device and the second device. Further, the process transmits first data from the third device to the first device. The first data indicates that the second device is unusable by the first device.

In another aspect of the disclosure, a computer program product comprises a computer useable medium having a computer readable program. The computer readable program when executed on a computer causes the computer to detect at a third device intermediate the first and second devices failure of communication between the first device and the second device. Further, the computer readable program when executed on the computer causes the computer to transmit first data from the third device to the first device, the first data indicating that the second device is unusable by the first device.

In yet another aspect of the disclosure, a computer program product comprises a memory device having stored therein a computer readable program. The computer readable program when executed on a computer causes the computer to detect at a third device intermediate the first and second devices failure of communication between the first device and the second device. Further, the computer readable program when executed on the computer causes the computer to transmit first data from the third device to the first device. The first data indicates that the second device is unusable by the first device.

In another aspect of the disclosure, a computer apparatus that manages a failure of communication between a first device and a second device is provided. The computer apparatus includes a memory storing processor readable instructions. Further the computer apparatus includes a processor arranged to read and execute instructions stored in the memory. The processor readable instructions comprise instructions arranged to control the computer to detect at a third device intermediate the first and second devices failure of communication between the first device and the second device. Further, the processor readable instructions comprise instructions arranged to control the computer to transmit first data from the third device to the first device, the first data indicating that the second device is unusable by the first device.

In yet another aspect of the disclosure, an apparatus that manages a failure of communication between a first device and a second device is provided. The apparatus includes means for detecting at a third device intermediate the first and second devices failure of communication between first device and the second device. Further, the apparatus includes means for transmitting first data from the third device to the first device, the first data indicating that the second device is unusable by the first device.

In another aspect of the disclosure, a resilient cable adaptor for connection between a first device and a second device is provided. The resilient cable adaptor includes a detector arranged to detect failure of communication between a connected first and second device. Further, the resilient cable adaptor includes a transmitter arranged to transmit first data to a connected first device. The first data indicates that a connected second device is unusable by the first device.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIGS. 1 and 1a are schematic illustrations of a prior art I/O configuration in which I/O devices are provided as components of a server.

FIG. 4 is a schematic illustration of an I/O configuration in which an I/O device is connected to a server according to an embodiment of the present invention.

FIG. 5 is a schematic illustration of a data packet header.

DETAILED DESCRIPTION

Figure 1:
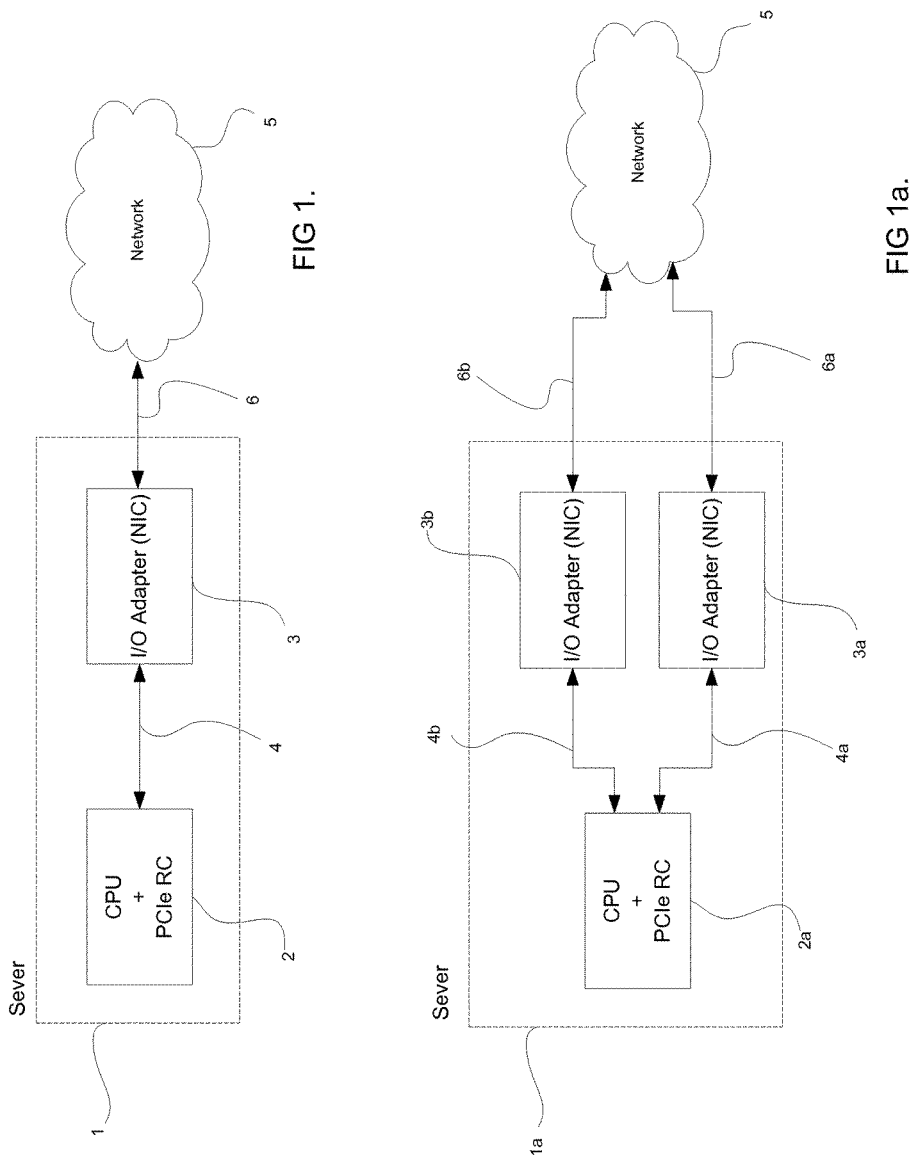

A method manages a failure of communication between a first device and a second device, comprising: detecting at a third device intermediate the first and second devices failure of communication between first device and the second device; and transmitting first data from the third device to the first device, the first data indicating that the second device is unusable by the first device.

In this way, the first device is not subjected to an unexpected loss of communication with the second device, which may have caused the first device to fail. By detecting the loss of communication between the first and second devices, the third device can send appropriate data to the first device to prevent failure of the first device. For example, the first data may hide the failure of communication from software (OS, drivers, applications) operating on the first device, by informing the first device that the second device has changed status. For example, the third device may emulate the continued existence of the second device, but in a state which the first device interprets as "available, but not usable". The first device may be adapted to gracefully handle the "available, but not usable" state without service interruption (for example by communicating with an alternative to the second device).

The third device may be within a failure unit defined by the first device, while the second device may be outside the failure unit defined by the first device. In indicating that the second device is unusable, the first data may indicate that the second device is locally functional but unable to perform its designated service due to an external problem, which may be temporary.

The method may further comprise intercepting, at the third device, second data from the first device to the second device.

The third device may be between the first and second devices such that communication between the first and second devices is via the third device. For example, the third device may take the form of a cable adaptor. Alternatively, data sent from the first device to the second device may be re-directed to the third device by a further device between first and second devices.

Detecting failure of communication between the first and second devices may comprise detecting that a response to the second data will not be received by the first device. Detecting failure of communication between the first and second devices may comprise detecting that a cable connecting the first and second devices has been disconnected. For example, detecting a cable disconnect may comprise detecting the absence of a previously present "cable detect" signal. Alternatively, where the connection between the first and second devices is a wireless connection, detecting failure of the communication may comprise detecting an interruption or interference in the wireless connection.

A part of the first data intended to indicate a source of the first data may indicate the second device. The first data may comprise data indicating that the first data is in response to the second data. For example, the second data may comprise a data field indicating a transaction to which the second data belongs and the first data may comprise data indicating that it belongs to the same transaction.

At least one of the first and second devices may be a server, and/or one of the first and second devices may be a remotely connected resource of the first or second device. For example, one of the first and second devices may be an I/O device or other remote resource.

The first device may be connected to the second device via a PCI Express connection.

The first data may indicate that the second device is unreachable, the first data may indicate that the second device has malfunctioned, and/or the first data may indicate that the first data is corrupt. For example, the first data may comprise a status bit having a value of "1", the status bit indicating that the second device has malfunctioned and/or that the first data is corrupt.

Detecting failure of communication between the first and second devices may comprise transmitting third data from the third device to the second device, and if a response to the third data is not received from the second device within a predetermined time period determining that failure of communication between the first and second devices has occurred.

According to a second aspect of the present invention, there is provided an apparatus for managing a failure of communication between a first device and a second device, comprising: means for detecting at a third device intermediate the first and second devices failure of communication between first device and the second device; and means for transmitting first data from the third device to the first device, the first data indicating that the second device is unusable by the first device.

According to a third aspect of the present invention, there is provided a resilient cable adaptor for connection between a first device and a second device, comprising: a detector arranged to detect failure of communication between a connected first and second device; and a transmitter arranged to transmit first data to a connected first device, the first data indicating that a connected second device is unusable by the first device.

It will be appreciated that many features described in connection with one aspect of the invention are applicable in connection with other aspects of the invention.

It will be appreciated that aspects of the present invention can be implemented in any convenient way including by way of suitable hardware and/or software. For example, a switching device arranged to implement the invention may be created using appropriate hardware components. Alternatively, a programmable device may be programmed to implement embodiments of the invention. The invention therefore also provides suitable computer programs for implementing aspects of the invention. Such computer programs can be carried on suitable carrier media including tangible carrier media (e.g. memory devices, hard disks, CD ROMs and so on) and intangible carrier media such as communications signals.

Referring to FIG. 1, a server 1 comprises a CPU/PCI Express Root Complex (CPU/RC) 2 and a Network Interface Controller (NIC) 3. The CPU/RC 2 is connected to the NIC 3 via a PCI Express chip-to-chip connection 4. The NIC 3 connects to a network 5 via an Ethernet connection 6 (which may be, for example, a cable or a wireless connection). Through use of the NIC 3 and appropriate software, the server 1 is configured to provide a user of the server 1 with access to the network 5. It will be appreciated that other details of the server 1 not pertinent to the present invention have been omitted for clarity, those details being readily apparent to those skilled in the art.

In general terms, the server 1 of FIG. 1 is considered to be a single failure unit. Failure of an internal component of the server 1 (such as the NIC 3 or the connection 4) is considered to be a failure of the whole of the server 1, as the server 1 can no longer provide its intended function (i.e. facilitation of access to the network 5). As such, upon failure of the NIC 3 or the communication between the NIC 3 and the CPU/RC 2, there is no requirement for the server 1 to continue functioning and the server 1 will fail.

In contrast to the failure of an internal component, the failure of an external component (i.e. outside the single failure unit of the server 1), such as the Ethernet connection 6, or a downstream switch (not shown), is not considered to be a failure of the server 1, and as such, continued operation of the server 1 is required. In general terms, failure of an externally connected component of the server 1 should not result in failure of the server 1 given that replacement devices may be easily connected (or re-connected in the event, for example, of unintentional disconnection). The server 1 is therefore adapted to gracefully handle situations where it is properly informed that external resources are currently unavailable. For example, provided that communication between the CPU/RC 2 and the NIC 3 is maintained, failure of the Ethernet connection 6 causes the NIC 3 to inform the CPU/RC 2 that the Ethernet connection 6 is unavailable (by transmission of a suitable error message). Upon receiving this message, the CPU/RC 2 can cease sending data packets to the NIC 3 for transmission over the Ethernet connection 6, without causing failure of the server 1 as a whole.

Upon receipt of an error message from a NIC, a CPU/RC may be able to continue to provide its designated service by utilizing backup resources where available. Referring to FIG. 1a, a server 1a comprises a CPU/RC 2a connected to a NIC 3a via a PCI Express chip-to-chip connection 4a and to a NIC 3b via a PCI Express chip-to-chip connection 4b. Each of the NICs 3a, 3b connects to the network 5 via respective Ethernet connections 6a, 6b. As such, each of the NICs 3a, 3b can facilitate access to the network 5. Upon failure of the Ethernet connection 6b, for example, the corresponding NIC 3b transmits an error message to the CPU/RC 2a indicating that the Ethernet connection 6b is unavailable. As the CPU/RC 2a is adapted to gracefully handle such error messages, the CPU/RC 2a can continue to provide its designated function using the NIC 3a and the Ethernet connection 6a.

Figure 2:
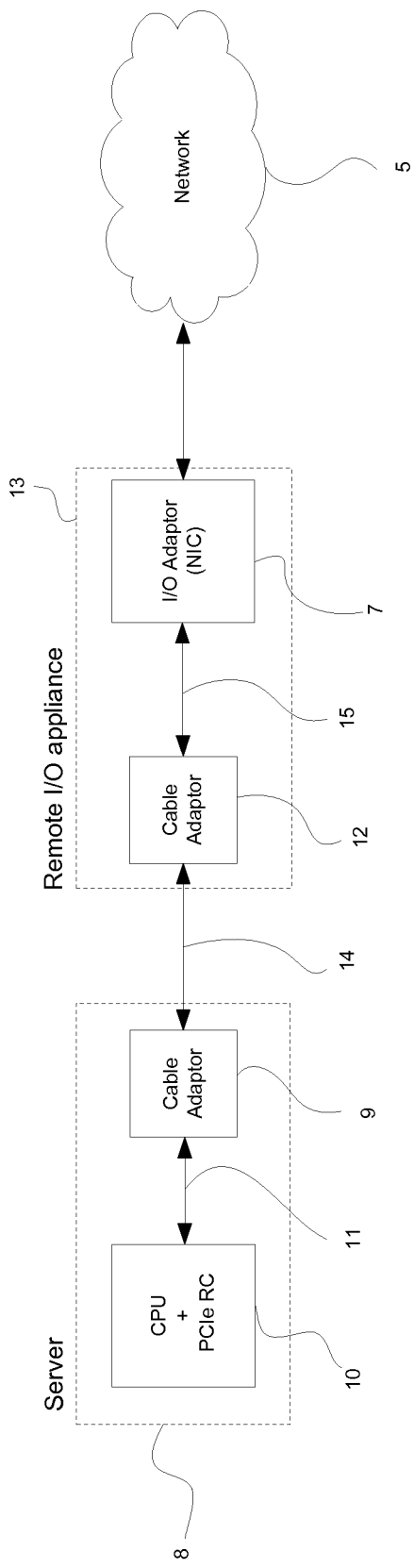
FIG. 2 is a schematic illustration of a prior art I/O configuration in which an I/O device is remotely connected to a server.

In the arrangement of FIG. 2, a NIC 7 is housed externally to a server 8 (i.e. outside the single failure unit defined by the server 8). Referring to FIG. 2, the server 8 comprises a PCI Express cable adaptor 9 connected to a CPU/RC 10 via a PCI Express connection 11. The PCI Express cable adaptor 9 connects the CPU/RC 10 to a PCI Express cable adaptor 12 housed within a remote I/O appliance 13 via a cable 14. The remote I/O appliance 13 also houses the NIC 7, which is connected by a PCI Express connection 15 to the PCI Express cable adaptor 12. The PCI Express cable adaptors 9, 12 provide only cable-driving and signal conditioning functionality required to transport PCI Express signals over the cable 14. That is, the cable adaptors 9, 12 do not provide any logical functions, such that, to (software operating on) the server 8, the system of FIG. 2 is logically identical to that of FIG. 1.

Failure of the cable 14, or failure of the NIC 7 itself, severs communication between the CPU/RC 10 and the NIC 7. As such, the CPU/RC 10 will receive no response to outstanding transactions with the NIC 7. As described above, the lack of response to an outstanding transaction results in failure of the server 8 as a whole. While in the arrangement of FIG. 1, it is generally acceptable that failure of the NIC 3 (or the connection 4 between the NIC 3 and the CPU/RC 2) constitutes failure of the server 1 as a whole, the remote nature of the cable 14 and NIC 7 in the arrangement of FIG. 2 means that these components can be easily replaced or re-connected. As such, in the arrangement of FIG. 2, it is undesirable that failure, either of the NIC 7 or the cable 14, should cause failure of the server 8.

Figure 3:
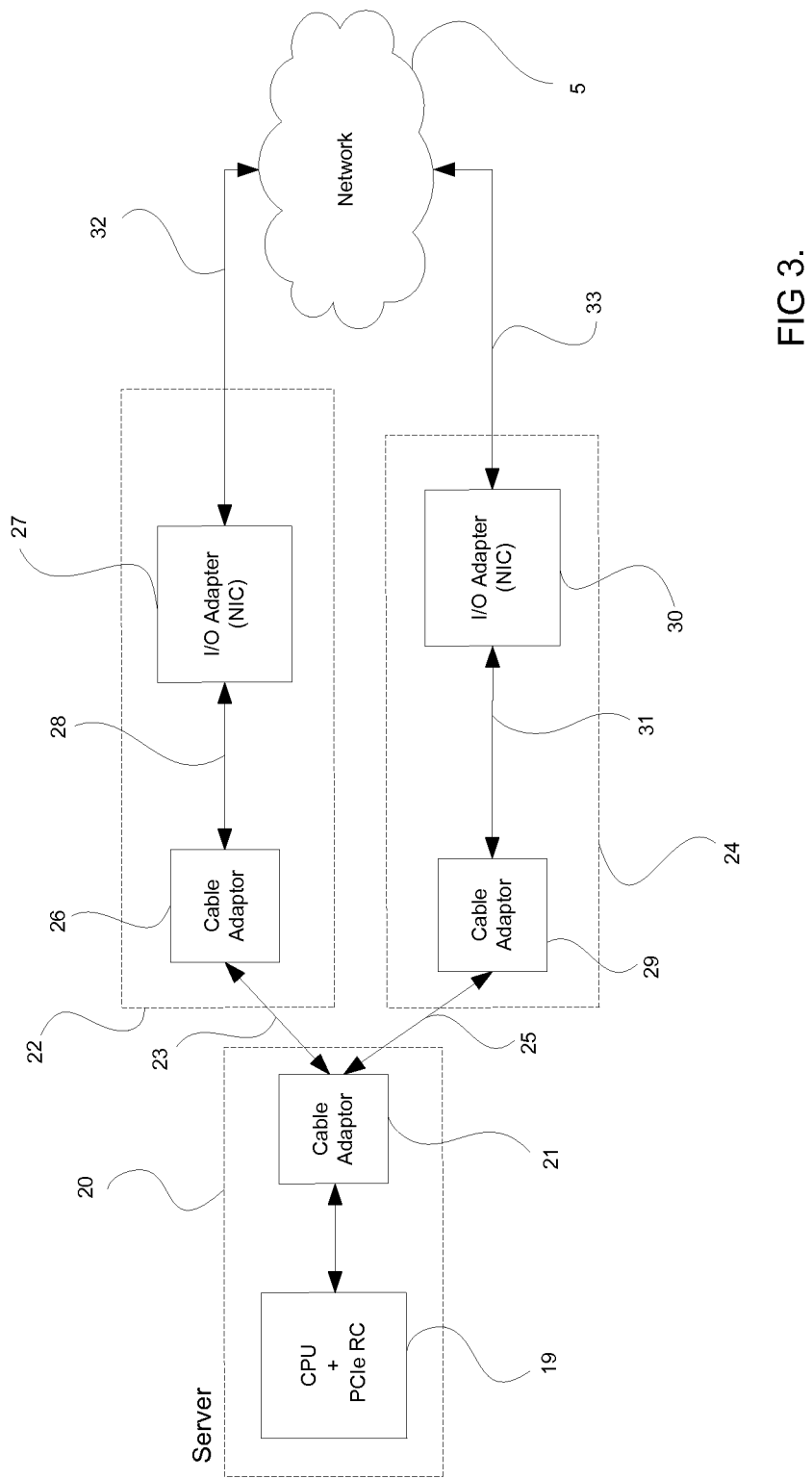
FIG. 3 is a schematic illustration of a prior art I/O configuration in which a plurality of I/O devices are remotely connected to a server.

Further, as illustrated in the arrangement of FIG. 3, placement of I/O resources remote a server more easily allows a plurality of I/O resources to be provided such that secondary resources may perform as backups in the event of failure of other connected I/O resources. Referring to FIG. 3 a CPU/RC 19 of a server 20 is connected, via a cable adaptor 21, to a remote I/O appliance 22 via a cable 23 and to a remote I/O appliance 24 via a cable 25. The remote I/O appliance 22 comprises a cable adaptor 26, for connection to the cable 23, and a NIC 27 connected to the cable adapter 26 via a connection 28. The remote I/O appliance 24 comprises a cable adapter 29, for connection to the cable 25, and a NIC 30 connected to the cable adapter 29 via a connection 31. Each NIC 27, 30 is connected to the network 5 via respective connections 32, 33. It will be appreciated that where one of the I/O appliances 22, 24 fails, such that communication is no longer possible with one of the NICs 27, 30, or upon failure of one of the connections 23, 25, the server 20 may continue to provide its designated service (i.e. connection to the network 5) using the other of the I/O appliances 22, 24. However, upon failure of either of the I/O appliances 22, 24 (or connections 23, 25), the CPU/RC 19 will receive no response to data packets transmitted to a disconnected one of the NICs 27, 30 resulting in an undesirable failure of the server 20.

FIG. 4 illustrates the general arrangement of FIG. 2, modified according to an embodiment of the present invention. In particular, in the arrangement of FIG. 4, a cable adaptor within the failure unit defined by a server is replaced with a resilient cable adaptor, the operation of which is described in more detail below. In general terms, however, the resilient cable adaptor converts fatal errors (such as the failure of a PCI cable) into non-fatal errors.

In FIG. 4, a server 35 comprises a CPU/RC 36 connected to a resilient cable adaptor 37 via a PCI Express connection 38. The resilient cable adaptor 37 connects the CPU/RC 36 to a PCI Express cable adaptor 38 housed within a remote I/O appliance 39 via a cable 40. The remote I/O appliance 39 houses a NIC 41, which is connected by a PCI Express connection 42 to the PCI Express cable adaptor 38, and to the network 5 via an Ethernet connection 43.

In more detail, the resilient cable adaptor 37 provides logic and hardware necessary to monitor for failure of components downstream of the resilient cable adaptor 37 (for example the cable 40, the NIC 41, etc.). For example, the resilient cable adaptor 37 is configured to detect when a cable is unplugged (for example, by way of a provided "presence detect" signal, or any other appropriate method) and to listen for messages from the remote I/O appliance 39 indicating a problem with the NIC 41. The resilient cable adaptor 37 is further adapted to inspect data packets in order to determine and record information regarding transactions initiated by the server 35, and to await the appropriate responses. Using an on-board timer, the resilient cable adaptor 37 can wait for a predetermined time period, the expiry of which constitutes the occurrence of a failure. For example, a threshold for the time period may be set such that it expires earlier than a time at which the server 35 would crash as a result of not receiving a response data packet. The resilient cable adaptor 37 may also be configured to generate data packets independently of the CPU/RC 36 for transmission to the NIC 41 and to await an appropriate response (whereby lack of a response within a predetermined time period constitutes failure of the NIC 41). It will be appreciated that failure of components downstream of the resilient cable adaptor 37 may have one or more of a plurality of differing causes, and that the resilient cable adaptor 37 may implement any appropriate means for detecting such events as will be readily apparent to those skilled in the art.

Upon detection of the failure of a downstream component, the resilient cable adaptor 37 emulates the NIC 41 to provide the CPU/RC 36 with a suitable non-fatal error message. The non-fatal error message indicates that the NIC 41 is available but in a state in which it cannot be used (for example, emulating a state in which the Ethernet cable 43 has been unplugged).

To emulate the NIC 41, the resilient cable adaptor 37 may generate data packets which appear to have been generated by the NIC 41. In more detail, the NIC 41 may have a plurality of independent device functions, a maximum of eight functions being supported by the PCI Express protocol. That is, the NIC 41 may appear to the CPU/RC 36 to be up to eight separate devices. Each device function of the NIC 41 has a corresponding identifier uniquely identifying that function. Data packets sent from a particular device function of the NIC 41 have a transaction identifier comprising a requester identifier that corresponds to the identifier of the device function sending the data packet.

The format of a data packet header used by the PCI Express protocol is described with reference to FIG. 5. A requester identifier 45 identifies a device function which originated the data packet and comprises sixteen bits indexed from 0 to 15. It can be seen that the requester identifier 45 comprises a bus number field 46 occupying an upper eight bits, device number field 47 occupying a central five bits and function number field 48 occupying a lower three bits. When using the PCI Express protocol the combination of bus number 46, device number 47 and function number 48 uniquely identifies a function provided by a particular device.

The packet header shown in FIG. 5 further comprises a tag field 49 comprising eight bits. As described above, a transaction may be made up of a request data packet and one or more corresponding completion data packets. Each request data packet is associated with a value which is stored in the tag field 49. Each corresponding completion data packet has the same value stored in the tag field 49, thus associating a completion data packet with the relevant request data packet. Unique tag values are allocated to all outstanding requests that require one or more completion data packets from a destination device. Given that the tag field 49 has eight bits, two hundred and fifty-six ($2^8$) possible tag values can be represented.

The function number field 48 is provided with a function number of the relevant function of the device sending a request. If a device has fewer than eight functions, there may be unused bits in the function number field 48. It is therefore known to use only sufficient bits of the function number field 48 to represent the functions of a device and to use any unused bits of the function number field 48 as a phantom function number which is logically combined with the tag field 29. Where only a single function is provided all bits of the function number field 48 can be logically combined with the tag field 49 to provide support for up to two thousand and forty-eight ($2^{11}$) outstanding requests.

The resilient cable adaptor 37 can examine a received data packet, and in particular the tag field and requester ID, in order to determine the transaction identifier of that data packet. This data can be stored in on-board memory, provided by the resilient cable adaptor. Data packets created by the resilient cable adaptor 37 can then be provided with the correct transaction identifier (if the type of error message being provided requires a transaction ID) such that the CPU/RC 36 believes that the messages relate to an outstanding transaction between the CPU/RC 36 and the NIC 41. Similarly, data packets can be generated by the resilient cable adaptor 37 having the requester ID of the NIC 41, so that those data packets appear to have been generated by the NIC 41.

A suitable error message is chosen in dependence upon the information recorded by the resilient cable adaptor 37 about the transaction. For example, where the CPU/RC 36 transmitted a register read request data packet to the NIC 41, upon failure of a downstream component severing communication between the CPU/RC 36 and the NIC 41, the resilient cable adaptor 37 may provide a data packet in which an error status bit is set to a value of "1". Software operating on the server 1 will interpret receipt of the data packet in which the status bit is set to indicate that an error has occurred, but the error will not cause failure of the server 35. As a further example, if the transaction concerns data transmitted over the network 5, the resilient cable adaptor 37 may transmit a message to the CPU/RC 36 indicating that the Ethernet connection 43 has been disconnected. Each error message may be hard coded into the onboard memory of the resilient cable adaptor 37. Logic operating on the resilient cable adaptor 37 may then be adapted to determine which of the stored messages is appropriate in light of a transaction which is awaiting a completion data packet.

The choice of error message provided to the CPU/RC 36 may further depend upon the particulars of the remotely connected device which the resilient cable adaptor 37 is emulating. For example, where the remotely connected device is a storage resource, error messages indicating that an Ethernet connection has been severed would be inappropriate. As such, the error messages may be tailored to the type of remotely connected device, to indicate that that device is locally functional but unable to perform its designate service (i.e. to replace a fatal error with a non-fatal error).

The above described embodiment of the present invention is based on two assumptions: first, any device remotely connected to the server 35 has a state in which the server 35 considers the device to be unusable but which does not cause the server 35 to crash; and second, that the unusable state is simple compared to the fully operational states of the I/O device.

It may additionally, or alternatively, be desirable to prevent a remotely connected I/O device failing when a connected server (or a connection to a server) fails. This is particularly, but not exclusively, appropriate in systems where a remote I/O device connects to, and is shared by, a plurality of servers (for example, in systems implementing multi-root I/O virtualization). It will be appreciated that the failure of one server should not cause the remote I/O device to fail and hence be unable to provide its service to the remaining server(s).

Figure 6:
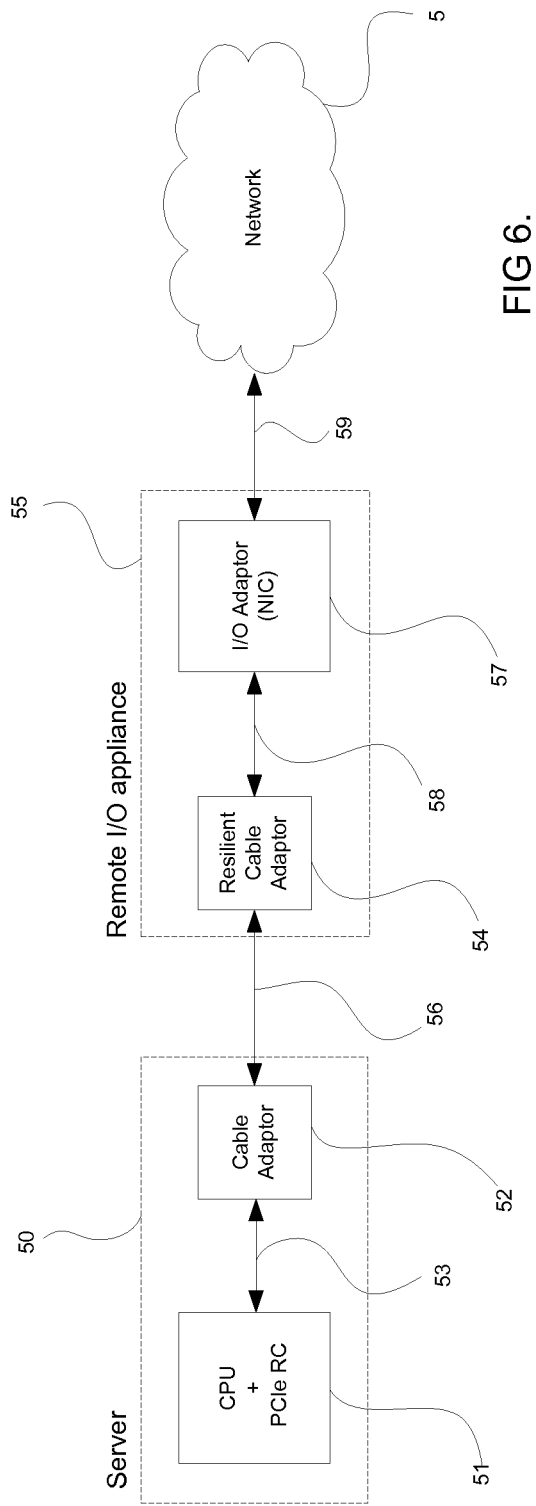
FIG. 6 is a schematic illustration of an I/O configuration in which a server is connected to an I/O device according to an embodiment of the present invention.

FIG. 6 illustrates the general arrangement of FIG. 2, modified according to an embodiment of the present invention. In particular, in the arrangement of FIG. 6, a cable adaptor within a remote I/O appliance is replaced with a resilient cable adaptor.

In FIG. 6, a server 50 comprises a CPU/RC 51 connected to a cable adaptor 52 via a PCI Express connection 53. The cable adaptor 52 connects the CPU/RC 51 to a resilient cable adaptor 54 housed within a remote I/O appliance 55 via a cable 56. The remote I/O appliance 55 also houses a NIC 57, which is connected by a PCI Express connection 58 to the resilient cable adaptor 54, and to the network 5 via an Ethernet connection 59.

The resilient cable adaptor 54 is adapted to detect failures of components upstream of the resilient cable adaptor 54. Upon detection of an upstream component failure, the resilient cable adaptor 54 is adapted to emulate the existence of the server 50. For example, the resilient cable adaptor 54 may be configured to issue completion data packets in response to outstanding memory read/write requests issued by the NIC 57, in a timely fashion, with a non-fatal error status.

As described above with reference to the resilient cable adaptor 37, the error messages provided to the NIC 57 will depend upon the transaction for which a completion data packet is required.

It will be appreciated that configurations of servers and remote resources may include both the resilient cable adaptor 37 and the resilient cable adaptor 54. That is, in some configurations a resilient cable adaptor may be provided both within one or more respective failure units defined by one or more servers, and within one or more failure units defined by one or more respective remotely connected resources.

The preceding described example embodiments have been described with reference to systems comprising PCI Express Ethernet network interface cards (NICs) which are remotely connected to a server. It will be appreciated, however, that the present invention is more generally applicable. Indeed, the present invention may be used in systems utilizing interconnects other than PCI Express, and with remote devices other than NICs (for example, Fibre Channel Host Bus Adaptors, storage controllers etc.).

Further, while the above description is concerned with systems comprising a server with a remotely connected resource of that server, it will be appreciated that the present invention may be used for communication between a first server and a second server.

Further, the present invention is applicable to other configurations of connected devices, such as multi-server I/O virtualization systems. Indeed, it will be appreciated that in many embodiments, systems utilizing the present invention may comprise a plurality of servers each having connections to a plurality of independent remote devices. Such arrangements would allow each server to continue useful operation in the event of a failure associated with one remote device by using another remotely connected device. Where multiple servers or multiple remote resources are provided, the resilient cable adaptor 37, 54 maintains a record of which server or which remote resource has failed in order to select an appropriate non-fatal error message (taking into account the active transactions of the failed server or remote resource where necessary).

It will further be appreciated that while the resilient cable adaptor is described above as a single device comprising the functionality of the present invention and the functionality of a standard cable adaptor, the present invention may be implemented in a dedicated device. For example, with reference to FIG. 2, a device implementing the present invention may be placed between the CPU/RC 10 and the cable adaptor 9, or between cable adaptor 9 and the cable 14.

The resilient cable adaptor 37, 54 may be implemented in a Field Programmable Gate Array (FPGA) or an Application-specific Integrated Circuit (ASIC). It will be appreciated, however, that the resilient cable adaptor 37, 54 may be implemented using any suitable means.

The preceding description has described embodiments of the invention where data packets are transmitted between a server and an I/O device. It will be appreciated that the term server is intended broadly and is intended to cover any computing device.

It is understood that the processes, systems, apparatuses, and compute program products described herein may also be applied in other types of processes, systems, apparatuses, and compute program products. Those skilled in the art will appreciate that the various adaptations and modifications of the embodiments of the processes, systems, apparatuses, and compute program products described herein may be configured without departing from the scope and spirit of the present processes, systems, apparatuses, and compute program products. Therefore, it is to be understood that, within the scope of the appended claims, the present processes, systems, apparatuses, and compute program products may be practiced other than as specifically described herein.

I claim:

1. A method of managing a failure of communication between a first device and a second device comprising:
    intercepting, at a third device intermediate to the first device and the second device, first data provided from the first device to the second device, wherein the first data comprises a data field indicating a transaction between the first and second devices to which the first data belongs;
    detecting, at the third device, failure of communication between the first device and the second device such that a response to the first data will not be received by the first device, wherein detecting failure of communication between the first and second devices comprises transmitting third data from the third device to the second device and determining that failure of communication between the first and second devices has occurred if a response to the third data is not received from the second device within a predetermined time period; and
    emulating, at the third device, continued communication from the second device by generating at and transmitting, from the third device to the first device, second data indicating that the second device is unusable by the first device to prevent a service interruption of the first device resulting from the response to the first data not being received by the first device from the second device, the second data comprising a part that indicates a source of the second data, the part of the second data indicating the second device so that the second data appears to originate from the second device, wherein said emulation comprises selecting, at the third device, an error message from a plurality of stored error messages, wherein the selection is based at least upon the transaction indicated by the data field of the first data, wherein the selected error message is included within the second data.

2. The method of claim 1, wherein the second data comprises data indicating that the second data is in response to the first data.

3. The method of claim 1, wherein at least one of the first and second devices is a server.

4. The method of claim 1, wherein at least one of the first and second devices is an I/O device.

5. The method of claim 1, wherein the first device is connected to the second device via a PCI Express connection.

6. The method of claim 1, wherein the second data indicates that the second device is unreachable.

7. The method of claim 1, wherein the second data indicates that the second device has malfunctioned.

8. The method of claim 1, wherein the second data indicates that the second data is corrupted.

9. The method of claim 1, wherein detecting failure of communication between the first and second devices comprises detecting that a cable connecting the first and second devices has been disconnected.

10. A computer program product comprising a computer useable storage device having a computer readable program, wherein the computer readable program when executed on a third device intermediate to a first device and a second device causes the third device to:
    intercept first data provided from the first device to the second device, wherein the first data comprises a data field indicating a transaction between the first and second devices to which the first data belongs;
    detect failure of communication between the first device and the second device such that a response to the first data will not be received by the first device, wherein detecting failure of communication between the first and second devices comprises transmitting third data from the third device to the second device and determining that failure of communication between the first and second devices has occurred if a response to the third data is not received from the second device within a predetermined time period;
    emulate continued communication from the second device by generating and transmitting second data to the first device to prevent a service interruption of the first device resulting from the response to the first data not being received by the first device from the second device, the second data indicating that the second device is unusable by the first device, the second data comprising a part that indicates a source of the second data, the part of the second data indicating the second device so that the second data appears to originate from the second device; and
    select an error message from a plurality of stored error messages, wherein the selection is based at least upon the transaction indicated by the data field of the first data, wherein the selected error message is included within the second data.

11. A computer program product comprising a memory device having stored therein a computer readable program, wherein the computer readable program when executed on a third device intermediate to a first device and a second device causes the third device to:
    intercept first data provided from the first device to the second device, wherein the first data comprises a data field indicating a transaction between the first and second devices to which the first data belongs;
    detect failure of communication between the first device and the second device such that a response to the first data will not be received by the first device, wherein detecting failure of communication between the first and second devices comprises transmitting third data from the third device to the second device and determining that failure of communication between the first and second devices has occurred if a response to the third data is not received from the second device within a predetermined time period;
    emulate continued communication from the second device by generating and transmitting second data to the first device to prevent a service interruption of the first device resulting from the response to the first data not being received by the first device from the second device, the second data indicating that the second device is unusable by the first device, the second data comprising a part that indicates a source of the second data, the part of the second data indicating the second device so that the second data appears to originate from the second device; and
    select an error message from a plurality of stored error messages, wherein the selection is based at least upon the transaction indicated by the data field of the first data, wherein the selected error message is included within the second data.

12. A computer apparatus that manages a failure of communication between a first device and a second device comprising:
    a memory storing processor readable instructions; and
    a processor arranged to read and execute instructions stored in the memory, wherein the processor readable instructions comprise instructions arranged to control the computer to:
    intercept first data provided from the first device to the second device, wherein the first data comprises a data field indicating a transaction between the first and second devices to which the first data belongs,
    detect failure of communication between the first device and the second device such that a response to the first data will not be received by the first device, wherein detecting failure of communication between the first and second devices comprises transmitting third data to the second device and determining that failure of communication between the first and second devices has occurred if a response to the third data is not received from the second device within a predetermined time period, and
    emulate continued communication from the second device by generating and transmitting second data to the first device to prevent a service interruption of the first device resulting from the response to the first data not being received by the first device from the second device, the second data indicating that the second device is unusable by the first device, the second data comprising a part that indicates a source of the second data, the part of the second data indicating the second device so that the second data appears to originate from the second device, wherein said emulation comprises selection of an error message from a plurality of stored error messages, wherein the selection is based at least upon the transaction indicated by the data field of the first data, wherein the selected error message is included within the second data.

13. An apparatus, comprising:

a resilient cable adaptor that intercepts first data provided from a connected first device to a connected second device, detects failure of communication between the connected first device and the connected second device such that a response the first data would not be received by the connected second device, and emulates continued communication from the connected second device by transmitting second data to the first device to prevent a service interruption of the first device resulting from the response to the first data not being received by the connected first device from the connected second device, the second data comprising a part that indicates a source of the second data, the part of the second data indicating the connected second device so that the second data appears to originate from the second device, the second data indicating that the connected second device is unusable by the first device, wherein the first data comprises a data field indicating a transaction between the first and second devices to which the first data belongs, wherein the resilient cable adaptor is further arranged to select an error message from a plurality of stored error messages, wherein the selection is based at least upon the transaction indicated by the data field of the first data, wherein the selected error message is included within the second data, wherein detecting failure of communication between the first and second devices comprises transmitting third data from the resilient cable adaptor to the second device and determining that failure of communication between the first and second devices has occurred if a response to the third data is not received from the second device within a predetermined time period.

* * * * *